(12) United States Patent
Fujiki (10) Patent No.: US 10,411,402 B2
(45) Date of Patent: Sep. 10, 2019

(54) DEVICE CONNECTOR

(71) Applicant: SUMITOMO WIRING SYSTEMS, LTD., Yokkaichi, Mie (JP)

(72) Inventor: Masashi Fujiki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/179,338

(22) Filed: Nov. 2, 2018

(65) Prior Publication Data

US 2019/0157803 A1 May 23, 2019

(30) Foreign Application Priority Data

Nov. 22, 2017 (JP) .................................. 2017-224832

(51) Int. Cl.
| | |
|---|---|
| *H01R 13/627* | (2006.01) |
| *H01R 13/621* | (2006.01) |
| *H01R 13/639* | (2006.01) |
| *B60R 16/02* | (2006.01) |
| *H01R 13/52* | (2006.01) |
| *H01R 13/64* | (2006.01) |
| *H01R 13/74* | (2006.01) |
| *H01R 13/516* | (2006.01) |
| *H01R 13/6592* | (2011.01) |

(52) U.S. Cl.
CPC ..... *H01R 13/6215* (2013.01); *B60R 16/0215* (2013.01); *H01R 13/5221* (2013.01); *H01R 13/639* (2013.01); *H01R 13/64* (2013.01); *H01R 13/748* (2013.01); *H01R 13/516* (2013.01); *H01R 13/5219* (2013.01); *H01R 13/621* (2013.01); *H01R 13/6592* (2013.01); *H01R 2201/26* (2013.01)

(58) Field of Classification Search
CPC .............. H01R 13/6215; H01R 13/639; H01R 13/5221; H01R 13/516; H01R 2201/26; B60R 16/0215
USPC ......................................................... 439/364
See application file for complete search history.

(56) References Cited

U.S. PATENT DOCUMENTS

| | | | | | |
|---|---|---|---|---|---|
| 1,733,457 | A | * | 10/1929 | Hannahs | ................ F16L 27/053 285/268 |
| 3,739,846 | A | * | 6/1973 | Beson | ................... E21B 33/047 166/89.2 |
| 4,133,558 | A | * | 1/1979 | Ahlstone | ................... F16L 1/26 285/146.3 |

(Continued)

FOREIGN PATENT DOCUMENTS

JP 2012-128966 A 7/2012

*Primary Examiner* — Abdullah A Riyami
*Assistant Examiner* — Vladimir Imas
(74) *Attorney, Agent, or Firm* — Oliff PLC (57) ABSTRACT

Erroneous operations are to be inhibited. A device connector includes a device-side connector and a wire-side connector. The device-side connector is fixed to a case by a fixing bolt that is threaded to a bolt fixing hole provided in the case. The wire-side connector is fixed to the case by a fastening bolt, and is connected to the device-side connector. The wire-side connector includes a connector shell that has an insertion hole through which the fastening bolt is to be passed, and a cover member configured to be attached to cover the connector shell. The cover member includes a housing portion disposed on the axis of the fixing bolt.

6 Claims, 5 Drawing Sheets

(56) References Cited

U.S. PATENT DOCUMENTS

| | | | | |
|---|---|---|---|---|
| 5,801,465 | A * | 9/1998 | Yamada | H01R 13/523 174/77 R |
| 5,951,059 | A * | 9/1999 | Kitamura | F16L 5/02 285/124.4 |
| 6,280,208 | B1 * | 8/2001 | Masuda | H01R 4/64 174/359 |
| 6,583,352 | B2 | 6/2003 | Fukushima | H01R 9/032 174/373 |
| 6,695,632 | B2 * | 2/2004 | Matsumoto | H01R 13/6485 439/246 |
| 6,796,838 | B2 * | 9/2004 | Yoshioka | H01R 13/648 439/607.01 |
| 7,306,475 | B2 * | 12/2007 | Tsuruta | H01R 4/30 439/364 |
| 7,614,910 | B2 * | 11/2009 | Croteau | H01R 13/512 439/559 |
| 7,811,116 | B2 * | 10/2010 | Sakakura | H01R 4/302 439/364 |
| 7,988,475 | B2 * | 8/2011 | Sakakura | H01R 9/032 439/271 |
| 8,011,977 | B2 * | 9/2011 | Tsuruta | H01R 13/6215 439/752 |
| 8,241,062 | B2 * | 8/2012 | Tsuruta | H01R 9/032 439/352 |
| 8,257,107 | B2 * | 9/2012 | Tsuruta | H01R 13/6581 439/362 |
| 8,342,880 | B2 * | 1/2013 | Kato | H01R 9/032 439/382 |
| 8,449,323 | B2 * | 5/2013 | Omae | H01R 13/5202 439/559 |
| 8,485,844 | B2 * | 7/2013 | Omae | H01R 13/5202 439/559 |
| 8,491,344 | B2 * | 7/2013 | Ishibashi | H01R 13/4223 439/752.5 |
| 8,556,660 | B2 * | 10/2013 | Matsuoka | B29C 45/1671 439/606 |
| 8,662,920 | B2 * | 3/2014 | Ishibashi | H01R 13/6592 439/564 |
| 8,905,770 | B2 * | 12/2014 | Fujiwara | H01R 13/516 439/181 |
| 9,039,450 | B2 * | 5/2015 | Germ | H01R 9/032 439/607.41 |
| 9,059,534 | B2 * | 6/2015 | Endo | H01R 13/52 |
| 9,564,706 | B2 * | 2/2017 | Ozawa | H01R 4/301 |
| 9,865,964 | B2 * | 1/2018 | Hashimoto | H01R 13/5208 |
| 9,944,172 | B2 * | 4/2018 | Basavarajappa | B60K 15/05 |
| 10,038,287 | B2 * | 7/2018 | Yamada | H01R 13/5202 |
| 2004/0106325 | A1 * | 6/2004 | Miyazaki | H01R 9/032 439/564 |
| 2007/0207652 | A1 * | 9/2007 | Tsuruta | H01R 4/30 439/166 |
| 2010/0261363 | A1 * | 10/2010 | Sakakura | H01R 4/34 439/271 |
| 2011/0117784 | A1 * | 5/2011 | Matsuoka | H01R 13/504 439/626 |
| 2012/0142214 | A1 * | 6/2012 | Kawamura | H01R 4/34 439/571 |
| 2012/0149226 | A1 * | 6/2012 | Ishibashi | H01R 13/5221 439/271 |
| 2013/0059466 | A1 * | 3/2013 | Ishibashi | H01R 13/6215 439/533 |

* cited by examiner

DEVICE CONNECTOR

TECHNICAL FIELD

The present disclosure relates to a device connector.

BACKGROUND ART

Conventionally, a device connector that is fixed to an electric device mounted on a vehicle, such as an inverter, by a fastening bolt has been proposed. The device connector includes a wire-side connector connected to an end of a wire, and a device-side connector capable of being fitted to the wire-side connector, and these connectors are each fixed to a case of the electric device by a bolt (e.g., see JP 2012-128966A).

JP 2012-128966A is an example of related art.

SUMMARY

However, when removing the wire-side connector from a device connector such as the one described above, an erroneous operation such as erroneously removing the device-side connector before removing the wire-side connector earlier may be performed.

It is an object of certain preferred embodiments to provide a device connector capable of inhibiting erroneous operations.

A device connector that solves the above-described problem includes: a device-side connector configured to be fixed to the device by a fixing bolt that is threaded to a first bolt hole provided in the device; and a wire-side connector configured to: be fixed to the device by a fastening bolt that is threaded to a second bolt hole provided in the device; and be connected to the device-side connector. The wire-side connector includes: a connector shell that has an insertion hole through which the fastening bolt is to be passed; and a cover member configured to be attached so as to cover the connector shell, and the cover member includes a bulged portion disposed on an axis of the fixing bolt.

With this configuration, the device-side connector of the device connector is fixed to the device by the fixing bolt. The wire-side connector that is connected to the device-side connector is fixed to the device by the fastening bolt. The wire-side connector includes the connector shell, and the cover member that is attached to cover the connector shell. The bulged portion of the cover member is disposed on the axis of the fixing bolt. The bulged portion makes it difficult to engage a tool with the fixing bolt, thus inhibiting the removal of the fixing bolt. Accordingly, it is possible to inhibit erroneous operations.

In the above-described device connector, it is preferable that the bulged portion is a housing portion that is formed to bulge outward so as to house a fixing portion of a fixing member for fixing a flexible conductor to the connector shell.

With this configuration, it is not necessary to provide a projection or the like on the cover member, and erroneous operations can be readily inhibited.

Preferably, the above-described device connector includes a fastening member configured to fix the cover member to the connector shell in a fastened state, wherein the fastening member is disposed between the bulged portion and the fixing bolt.

With this configuration, the bulged portion and the fastening member of the cover member make it further difficult to engage a tool with the fixing bolt, thus making it possible to inhibit erroneous operations.

In the above-described device connector, it is preferable that the fastening member includes a belt-shaped portion, and a lock portion that is formed integrally with the belt-shaped portion at a first end portion of the belt-shaped portion, and the lock portion is disposed between the bulged portion and the fixing bolt so as to span the fixing bolt in an axial direction of the fixing bolt.

With this configuration, the lock portion of the fastening member makes it difficult to engage a tool with the fixing bolt. Accordingly, it is possible to inhibit erroneous operations without using any additional members.

In the above-described device connector, it is preferable that the fastening member is disposed between the bulged portion and the fixing bolt such that a second end portion of the belt-shaped portion protrudes from the lock portion.

With this configuration, using the end portion of the belt-shaped portion of the fastening member makes it more difficult to engage a tool with the fixing bolt, thus making it possible to inhibit erroneous operations.

In the above-described device connector, it is preferable that the cover member includes a first mounting protrusion and a second mounting protrusion that extend along a circumferential direction thereof, a distance between the first mounting protrusion and the second mounting protrusion is set so as to allow insertion of the belt-shaped portion, and not to allow insertion of the lock portion, and the first mounting protrusion and the second mounting protrusion are not formed in a region in which the lock portion is disposed in the cover member.

With this configuration, the first mounting protrusion and the second mounting protrusion allow the lock portion of the fastening member to be readily disposed at the position corresponding to the fixing bolt.

With the device connector according to some preferred embodiments, it is possible to inhibit erroneous operations.

EMBODIMENTS

Hereinafter, embodiments will be described.

Note that the accompanying drawings may show enlarged constituent elements in order to facilitate understanding. The dimensional proportions of the constituent elements may be different from the actual proportions, or the proportions shown in the drawings. In the cross-sectional views, the hatching for some of the constituent elements may be omitted in order to facilitate understanding.

Figure 5:
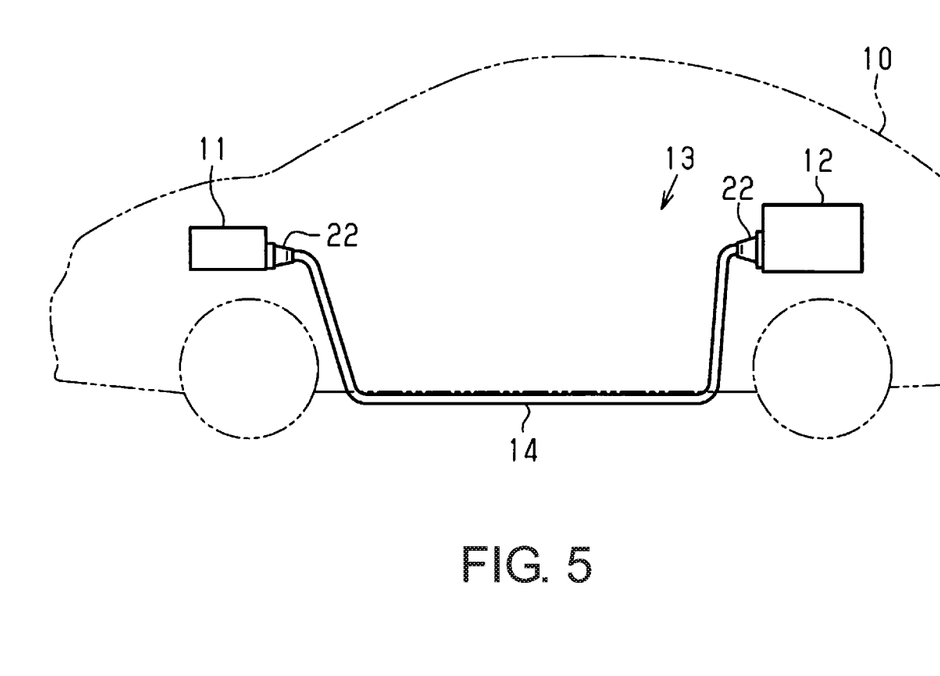
FIG. 5 is a schematic diagram showing an example of the routing state of a wire harness.

A vehicle 10 shown in FIG. 5 is a hybrid car, an electric car, or the like, for example. The vehicle 10 includes an inverter 11 as a device, a high-voltage battery 12, and a wire harness 13 that electrically connects the inverter 11 and the high-voltage battery 12 to each other. The inverter 11 is mounted in the front portion of the vehicle 10, and the high-voltage battery 12 is mounted in the rear portion of the vehicle 10. The wire harness 13 is routed so as to pass underneath the floor of the vehicle 10.

The wire harness 13 includes a protective tube 14 and a wire-side connector 22. A wire (not shown) that electrically connects the inverter 11 to the high-voltage battery 12 is passed through the protective tube 14. The protective tube 14 protects the wire against water, flying stones, and the like. For example, a metal pipe made of aluminum or the like, a flexible corrugated tube made of resin or the like, or a combination thereof may be used as the protective tube 14. The wire-side connector 22 is connected to a device-side connector of an electric device (the inverter 11 and the high-voltage battery 12 in FIG. 5). The wire-side connector and the device-side connector to which the wire-side connector is connected constitute a device connector.

Figure 1A:
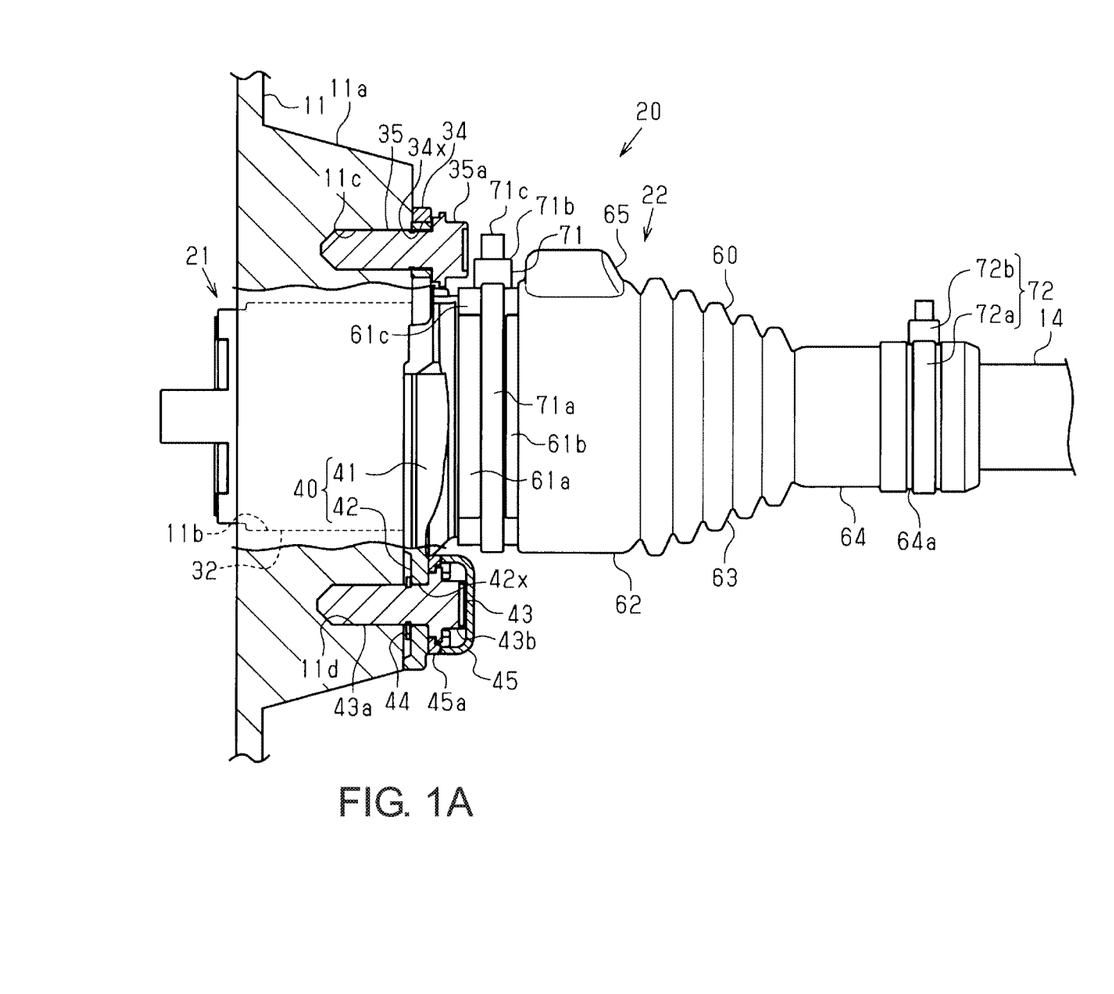
FIG. 1(a) is a partial cross-sectional view of a device connector.
Figure 1B:
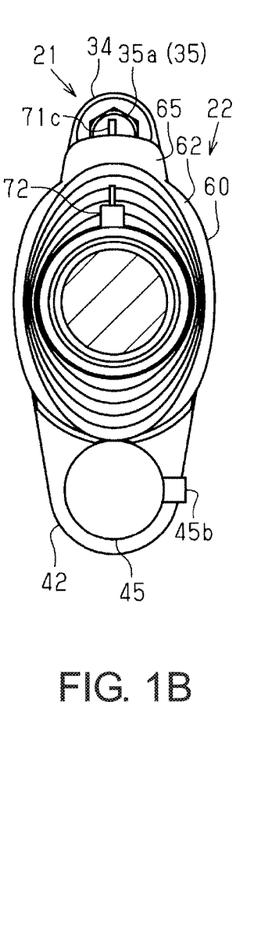
FIG. 1(b) is a diagram illustrating the device connector as viewed from the wire side.

As shown in FIGS. 1(a) and 1(b), the device connector 20 includes a device-side connector 21, and a wire-side connector 22 that is connected to the device-side connector 21. The device-side connector 21 is fixed, as an electric device, to a case 11a of the inverter 11, for example. The wire-side connector 22 is attached to an end portion of the wire (not shown).

Figure 2:
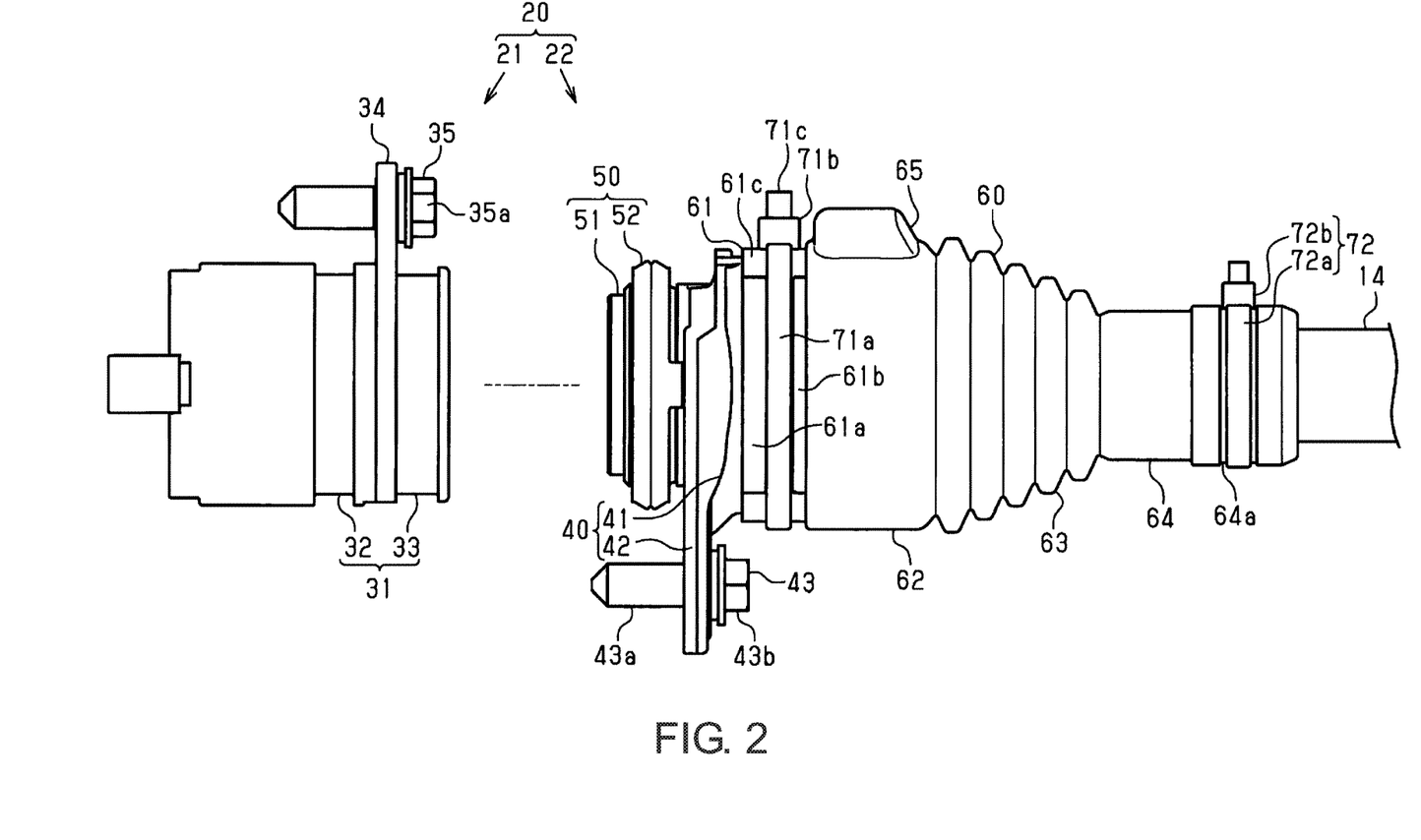
FIG. 2 is a diagram illustrating a device-side connector and a wire-side connector of the device connector.

As shown in FIGS. 1(a) and 2, the device connector 20 includes a device-side connector housing 31. A terminal fitting (e.g., a male terminal fitting), which is not shown, is internally mounted to the device-side connector housing 31. For example, a synthetic resin may be used as the material of the device-side connector housing 31. The device-side connector housing 31 can be formed, for example, by molding a terminal fitting.

The device-side connector housing 31 includes a device-side fitting portion 32, a hood portion 33, and a fixing portion 34, and these components are formed integrally. The device-side fitting portion 32 is formed so as to be capable of being fitted to an attachment hole 11b of the case 11a. A rubber ring (not shown) is mounted onto the outer circumference of the device-side fitting portion 32. The rubber ring is in intimate contact with the inner circumferential surface of the attachment hole 11b, thus providing waterproofing between the device-side fitting portion 32 and the attachment hole 11b.

The hood portion 33 is formed so as to protrude to the wire-side connector 22 side relative to the case 11a. The distal end of a wire-side connector housing 50, which will be described later, of the wire-side connector 22 is inserted into the hood portion 33. The hood portion 33 is formed, for example, in an oblong shape having an outer circumferential shape that is vertically oriented. A rubber ring 36 is mounted onto the outer circumference of the hood portion 33. The rubber ring 36 comes into intimate contact with the inner circumferential surface of a connector shell 40 of the wire-side connector 22, thus providing waterproofing between the hood portion 33 and the connector shell 40.

The fixing portion 34 is formed so as to protrude from the hood portion 33 in a predetermined direction (upward in FIG. 1(a)). The fixing portion 34 is formed in the shape of a thin plate, and has an insertion hole 34x extending therethrough in the thickness direction. A fixing bolt 35 for fixing the device-side connector 21 to the case 11a is passed through the insertion hole 34x. The device-side connector 21 is fixed to the case 11a by screwing the fixing bolt 35 into a bolt fixing hole 11c of the case 11a.

As shown in FIG. 2, the wire-side connector 22 includes the connector shell 40, the wire-side connector housing 50, and a cover member 60. The wire-side connector housing 50 houses a terminal fitting (e.g., a female terminal fitting) electrically connected to a core wire of a wire (all not shown) provided in the protective tube 14. An insulating synthetic resin can be used as the material of the wire-side connector housing 50. The wire-side connector housing 50 is covered by the connector shell 40.

The connector shell 40 includes a housing portion 41 and a fixing portion 42. The housing portion 41 is formed to be capable of housing a portion of the wire-side connector housing 50. The housing portion 41 is formed in the shape of a vertically oriented, elongated cylinder, for example. The wire-side connector housing 50 includes a fitting portion 51 that protrudes from the connector shell 40 in a state in which the fitting portion 51 is partially housed in the housing portion 41 of the connector shell 40. The fitting portion 51 is inserted into the hood portion 33 of the device-side connector housing 31. A rubber ring 52 is mounted onto the outer circumference of the fitting portion 51. The rubber ring 52 comes into intimate contact with the inner circumferential surface of the hood portion 33, thus providing waterproofing between the fitting portion 51 and the hood portion 33.

The fixing portion 42 is formed so as to protrude outward in a radial direction from the housing portion 41. The fixing portion 42 is formed so as to protrude in a direction opposite to the direction of protrusion of the fixing portion 34 of the device-side connector housing 31, or in other words, the fixing portion 42 is formed so as to protrude downward relative to the housing portion 41 in FIG. 2. The fixing portion 42 is formed in a substantially plate-like shape. As shown in FIG. 1(a), the fixing portion 42 has an insertion hole 42x extending therethrough in the thickness direction. A shaft portion 43a of a fastening bolt 43 is passed through the insertion hole 42x. The wire-side connector 22 is fixed to the case 11a by screwing the fastening bolt 43 into a bolt fixing hole 11d of the case 11a.

As shown in FIG. 1(a), a C-ring 44 is mounted to the shaft portion 43a of the fastening bolt 43. By mounting the C-ring 44 to the shaft portion 43a of the fastening bolt 43 that is passed through the insertion hole 42x, the fastening bolt 43 is pivotally supported by the fixing portion 42 so as to be kept from coming loose. A head portion 43b of the fastening bolt 43 is covered by a bolt cap 45. The bolt cap 45 is connected, via a flexible hinge 45b shown in FIG. 1(b), to an annular mounting portion 45a through which the shaft portion 43a of the fastening bolt 43 is passed. The bolt cap 45 is fixed to the mounting portion 45a, and covers the head portion 43b of the fastening bolt 43.

As shown in FIG. 1(a), the cover member 60 is formed in a substantially tubular shape. The cover member 60 is formed so as to span between the connector shell 40 and the protective tube 14. The cover member 60 is fastened and fixed by using a fastening band 71 so as to be in intimate contact with the outer face of the connector shell 40. Also, the cover member 60 is fastened and fixed by using a fastening band 72 so as to be in intimate contact with the outside of an end portion of the protective tube 14.

Figure 3:
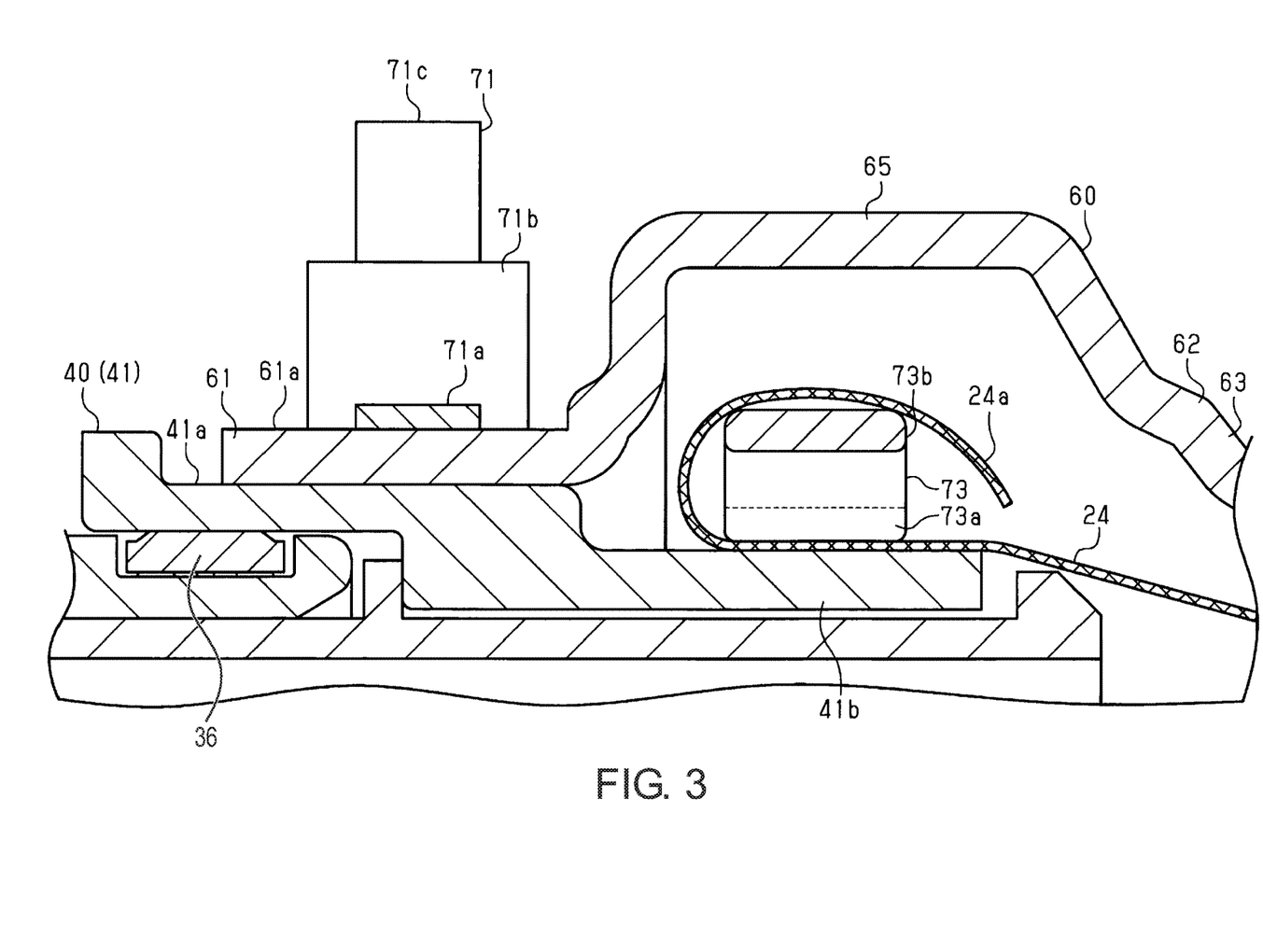
FIG. 3 is a partially enlarged cross-sectional view of the device connector.

As shown in FIG. 3, the housing portion 41 of the connector shell 40 is formed so as to become smaller in a step-like manner toward the protective tube 14 shown in FIG. 1(a), etc., and includes a cover mounting portion 41a and a conductor mounting portion 41b.

In the housing portion 41, the cover mounting portion 41a is disposed on the device side (the left side in FIG. 3) where the connector shell 40 is mounted. The conductor mounting portion 41b is disposed on the protective tube 14 side (the right side is FIG. 3) shown in FIG. 1 relative to the cover mounting portion 41*a*. The cover mounting portion 41*a* and the conductor mounting portion 41*b* are formed such that the connector shell 40 is shaped in a stepped manner. More specifically, the outer shape of the conductor mounting portion 41*b* is set to be a shape that is formed by reducing the outer shape of the cover mounting portion 41*a*.

As shown in FIG. 1(*a*), the cover member 60 includes a connector fastening portion 61, a covering portion 62, a bellows portion 63, and a protective tube fastening portion 64, disposed in this order from the connector shell 40 side toward the protective tube 14.

Figure 4:
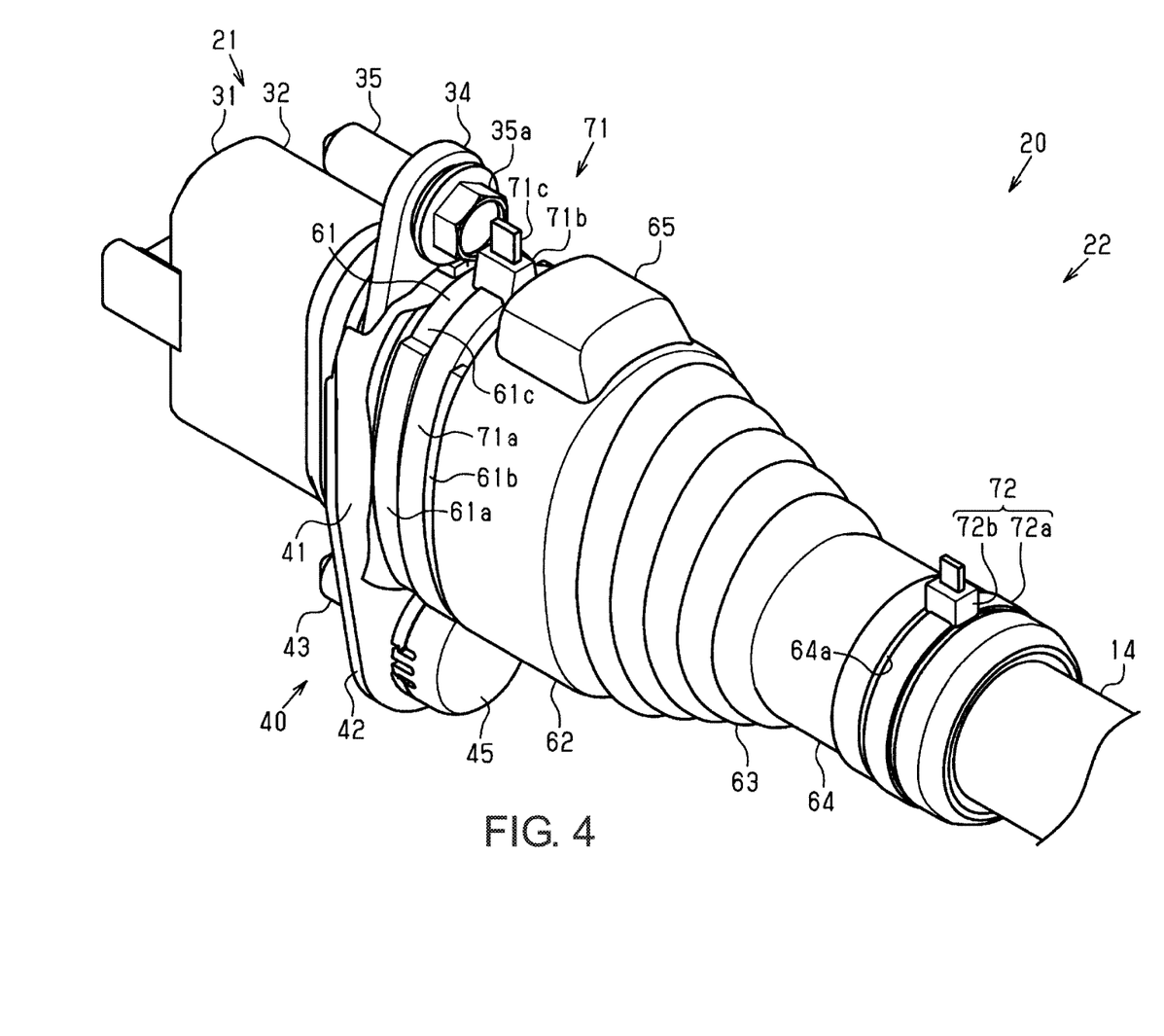
FIG. 4 is a perspective view of the device connector.

As shown in FIGS. 2 and 4, the connector fastening portion 61 is formed in a tubular shape that covers the cover mounting portion 41*a* of the connector shell 40. A plurality of (e.g., two) sealing lips protruding inward are provided on the inner circumferential surface of the connector fastening portion 61. The sealing lips are formed continuously on the entire circumference of the connector fastening portion 61.

As shown in FIGS. 1(*a*), 2, and 4, mounting protrusions 61*a* and 61*b* are partially formed in the circumferential direction on the outer circumferential surface of the connector fastening portion 61. In the present embodiment, the mounting protrusions 61*a* and 61*b* are not formed at upper and lower end portions of the connector fastening portion 61. The portions where the mounting protrusions 61*a* and 61*b* are not formed function as a lock region 61*c* for fixing the fastening band 71. The mounting protrusion 61*a* and the mounting protrusion 61*b* are formed parallel to each other. The distance (groove width) between the two mounting protrusions 61*a* and 61*b* is set according to the shape of the fastening band 71.

The fastening band 71 is a cable tie, for example. The fastening band 71 includes a belt-shaped portion 71*a*, and a lock portion 71*b* that is formed integrally with the belt-shaped portion 71*a* at one end of the belt-shaped portion 71*a*. The lock portion 71*b* includes a locking pawl. By engaging the locking pawl of the lock portion 71*b* with one of a plurality of locking protrusions formed on the belt-shaped portion 71*a*, the belt-shaped portion 71*a* is locked to the lock portion 71*b*. Thus, the connector fastening portion 61 is fastened and fixed to the cover mounting portion 41*a*. The lock portion 71*b* is disposed between the fixing bolt 35 and a housing portion 65, which will be described later, of the cover member 60, and is disposed so as to span the head portion 35*a* of the fixing bolt 35. An end portion 71*c* of the belt-shaped portion 71*a* protrudes from the lock portion 71*b* toward the outside of the connector fastening portion 61. The sealing lips formed on the inner circumferential surface of the connector fastening portion 61 come into close contact with the outer circumferential surface of the cover mounting portion 41*a*, thus realizing sealing between the cover member 60 and the connector shell 40.

The mounting protrusions 61*a* and 61*b* of the connector fastening portion 61 described above are formed so as to allow insertion of the belt-shaped portion 71*a* of the fastening band 71 therebetween, and to not allow insertion of the lock portion 71*b* of the fastening band 71 therebetween. Thus, the lock portion 71*b* of the fastening band 71 is disposed in the lock region 61*c* of the connector fastening portion 61.

The covering portion 62 is formed so as to cover the conductor mounting portion 41*b* at a predetermined distance from the outer circumferential surface of the conductor mounting portion 41*b*. For example, the covering portion 62 is formed to have an outer shape that is formed by slightly increasing the size of the outer shape of the connector fastening portion 61. The housing portion 65 is formed protruding outward in a radial direction from the covering portion 62. The housing portion 65 is disposed on the axis of the fixing bolt 35.

The bellows portion 63 is formed to have an outer shape that gradually becomes smaller starting from the covering portion 62.

The protective tube fastening portion 64 is formed in a tubular shape that covers the protective tube 14. A mounting groove 64*a* is recessed on the entire outer circumferential surface of the protective tube fastening portion 64. A fastening band 72 is mounted to the mounting groove 64*a*. As with the fastening band 71 described above, a known fastening band can be used as the fastening band 72. The width of the mounting groove 64*a* is set so as to allow insertion of the belt-shaped portion 72*a* and the lock portion 72*b* of the fastening band 72 into the mounting groove 64*a*. The fastening band 72 fastens and fixes the protective tube fastening portion 64 to the protective tube 14.

As shown in FIG. 3, a flexible conductor 24 is connected to the conductor mounting portion 41*b*. The flexible conductor 24 is internally mounted to the protective tube 14 shown in FIG. 1(*a*), etc., for example. A wire (not shown) is passed through the flexible conductor 24. The flexible conductor 24 is, for example, a braided member formed by braiding copper-based metal element wires with tin-plated surfaces into a mesh and into the shape of a long tube. Note that a metal sheet (metal foil), a metal woven fabric, or the like that is formed in a tubular shape can be used as the flexible conductor 24.

The flexible conductor 24 is attached so as to cover the conductor mounting portion 41*b*, and is fixed with a fixing member 73. For example, the fixing member 73 includes a diametrically contractible, annular body portion 73*a*, and a fixing portion 73*b* that maintains the diametrically contracted state of the body portion 73*a*. The housing portion 65 of the cover member 60 is disposed on the axis of the fixing bolt 35, and is formed by making a portion of the covering portion 62 bulge outward so as to comfortably house the fixing portion 73*b* of the fixing member 73. For example, the housing portion 65 is formed such that the outer face of the housing portion 65 is located outward of the lock portion 71*b* of the fastening band 71.

For example, a known crimp ring can be used as the fixing member 73. For example, a crimp ring including a crimp portion may be used as the crimp ring. The crimp ring is configured such that, in a natural state, a portion of a ring-shaped body portion circumvents outward in a radial direction and protrudes as the crimp portion. When fastening the crimp ring, the body portion can be brought to a diametrically contracted state by pinching base parts of the crimp portion so as to be brought close to each other. Thus, the flexible conductor 24 is fixed to the conductor mounting portion 41*b* of the connector shell 40. Note that a crimp ring including no crimp portion can also be used as the crimp ring.

An end portion 24*a* of the flexible conductor 24 is folded back so as to cover the fixing member 73. The end portion 24*a* of the flexible conductor 24 is wrapped with tape. This tape wrapping prevents removal or the like of the flexible conductor 24.

Operation

The device connector 20 includes the device-side connector 21 and the wire-side connector 22. The device-side connector 21 is fixed to the case 11*a* by the fixing bolt 35 that is threaded to the bolt fixing hole 11*c* provided in the case 11*a*. The wire-side connector 22 is fixed to the case 11*a* by the fastening bolt 43, and is connected to the device-side connector 21. The wire-side connector 22 includes the connector shell 40 with the insertion hole 42x through which the fastening bolt 43 is passed, and the cover member 60 that is attached so as to cover the connector shell 40. The cover member 60 includes the housing portion 65 disposed on the axis of the fixing bolt 35.

Accordingly, the housing portion 65 of the cover member 60 is disposed on the axis of the fixing bolt 35. The housing portion 65 makes it difficult to engage a tool with the head portion 35a of the fixing bolt 35, thus inhibiting the removal of the fixing bolt 35. Accordingly, it is possible to inhibit erroneous operations.

The housing portion 65 of the cover member 60 is formed to bulge outward so as to house the fixing portion 73b of the fixing member 73 for fixing the flexible conductor 24 to the connector shell 40. Accordingly, it is not necessary to provide a projection or the like on the cover member 60, erroneous operations such as early removal of the device-side connector 21 can be readily inhibited. The housing portion 65 has the function of housing the fixing portion 73b of the fixing member 73, and the function of inhibiting erroneous operations being made to the fixing bolt 35. Accordingly, it is possible to suppress an increase in the size of the outer shape of the cover member 60, as compared with when these functions are separately provided.

The cover member 60 is fixed to the connector shell 40 by the fastening band 71. The fastening band 71 is disposed between the housing portion 65 and the fixing bolt 35. Then, the lock portion 71b of the fastening band 71 is disposed on the axis of the fixing bolt 35. Accordingly, the housing portion 65 of the cover member 60 and the fastening band 71 make it further difficult to engage a tool with the head portion 35a of the fixing bolt 35, thus making it possible to inhibit erroneous operations.

The fastening band 71 includes the belt-shaped portion 71a, and the lock portion 71b formed integrally with the belt-shaped portion 71a at an end portion of the belt-shaped portion 71a. The lock portion 71b is disposed between the housing portion 65 and the fixing bolt 35. Accordingly, the lock portion 71b of the fastening band 71 makes it difficult to engage a tool with the head portion 35a of the fixing bolt 35. Accordingly, it is possible to inhibit erroneous operations without using any additional members.

The fastening band 71 is disposed between the housing portion 65 and the fixing bolt 35 such that the end portion 71c of the belt-shaped portion 71a protrudes from the lock portion 71b. Thus, the end portion 71c of the belt-shaped portion 71a of the fastening band 71 serves as an obstacle to make it more difficult to engage a tool with the head portion 35a of the fixing bolt 35, thus making it possible to inhibit erroneous operations.

For example, erroneous operations made to the fixing bolt 35 can also be inhibited by providing a projection on the connector shell 40. However, as a result of providing a projection on the connector shell 40, the cover member 60 is fastened on the distal end side (the right side in FIG. 1(a)) of the connector shell 40, and the length of the connector shell 40 will increase. In contrast, according to the present embodiment, the length of the connector shell 40 can be decreased, as compared with when a projection is provided on the connector shell 40.

In the device connector 20 described above, the cover member 60 includes the mounting protrusion 61a and the mounting protrusion 61b that extend along the circumferential direction thereof. The distance between the mounting protrusion 61a and the mounting protrusion 61b is set so as to allow insertion of the belt-shaped portion 71a, and not to allow insertion of the lock portion 71b. The mounting protrusion 61a and the mounting protrusion 61b are formed on the housing portion 65 side of the cover member 60, thus forming the lock region 61c. As such, the mounting protrusion 61a and the mounting protrusion 61b allow the lock portion 71b of the fastening band 71 to be readily disposed in the lock region 61c corresponding to the fixing bolt 35.

As described above, the following effects can be achieved by the present embodiment.

(1) The device connector 20 includes the device-side connector 21 and the wire-side connector 22. The device-side connector 21 is fixed to the case 11a by the fixing bolt 35 that is threaded to the bolt fixing hole 11c provided in the case 11a. The wire-side connector 22 is fixed to the case 11a by the fastening bolt 43, and is connected to the device-side connector 21. The wire-side connector 22 includes the connector shell 40 with the insertion hole 42x through which the fastening bolt 43 is passed, and the cover member 60 that is attached so as to cover the connector shell 40. The cover member 60 includes the housing portion 65 disposed on the axis of the fixing bolt 35. Accordingly, the housing portion 65 of the cover member 60 is disposed on the axis of the fixing bolt 35. The housing portion 65 makes it difficult to engage a tool with the fixing bolt 35, thus inhibiting removal of the fixing bolt 35. Accordingly, it is possible to inhibit erroneous operations such as early removal of the device-side connector 21.

(2) The housing portion 65 of the cover member 60 is formed to bulge outward so as to house the fixing portion 73b of the fixing member 73 for fixing the flexible conductor 24 to the connector shell 40. Accordingly, it is not necessary to provide a projection or the like on the cover member 60, making it possible to readily inhibit erroneous operations.

(3) The cover member 60 is fixed to the connector shell 40 by the fastening band 71. The lock portion 71b of the fastening band 71 is disposed between the housing portion 65 and the fixing bolt 35, and on the axis of the fixing bolt 35. Accordingly, the housing portion 65 of the cover member 60 and the fastening band 71 make it more difficult to engage a tool with the fixing bolt 35, thus making it possible to inhibit erroneous operations.

(4) The length of the connector shell 40 can be decreased, as compared with when a projection is provided on the connector shell 40.

Note that the above embodiment may be implemented in the following manner.

Although the cover member 60 in the above embodiment includes the bellows portion 63, it is possible to use a cover member whose outer shape gradually becomes smaller starting from the covering portion 62 toward the protective tube fastening portion 64.

The shape of the connector shell 40 in the above embodiment may be changed as appropriate.

In the above embodiment, the bolt cap 45 may be omitted.

In the above embodiment, the mounting protrusion 61b may be omitted.

In contrast to the above embodiment, the lock portion 71b of the fastening band 71 may be displaced from the head portion 35a of the fixing bolt 35.

In contrast to the above embodiment, a projecting portion or the like may be provided separately from the housing portion 65.

LIST OF REFERENCE NUMERALS

11a; Case
11c; Bolt Fixing Hole (First Bolt Hole)

11d; Bolt Fixing Hole (Second Bolt Hole)
20; Device Connector
21; Device-Side Connector
22; Wire-Side Connector
35; Fixing Bolt
35a; Head Portion
43; Fastening Bolt
60; Cover Member
65; Housing Portion (Bulged Portion)
71; Fastening band (Fastening member)
71a; Belt-Shaped Portion
71b; Lock Portion
73; Fixing Member
73b; Fixing Portion

What is claimed is:

1. A device connector configured to be attached and fixed to a device, the device connector comprising:
    a device-side connector configured to be fixed to the device by a fixing bolt that is threaded to a first bolt hole provided in the device; and
    a wire-side connector configured to be fixed to the device by a fastening bolt that is threaded to a second bolt hole provided in the device and to be connected to the device-side connector, wherein
    the wire-side connector includes:
    a connector shell that has an insertion hole through which the fastening bolt is to be passed; and
    a cover member configured to be attached so as to cover the connector shell, and
    the cover member includes a bulged portion disposed on an axis of the fixing bolt.

2. The device connector according to claim 1, wherein the bulged portion is a housing portion that is formed to bulge outward so as to house a fixing portion of a fixing member for fixing a flexible conductor to the connector shell.

3. The device connector according to claim 1, comprising a fastening member configured to fix the cover member to the connector shell in a fastened state, wherein
    the fastening member is disposed between the bulged portion and the fixing bolt.

4. The device connector according to claim 3, wherein the fastening member includes a belt-shaped portion, and a lock portion that is formed integrally with the belt-shaped portion at a first end portion of the belt-shaped portion, and
    the lock portion is disposed between the bulged portion and the fixing bolt so as to span the fixing bolt in an axial direction of the fixing bolt.

5. The device connector according to claim 4, wherein the fastening member is disposed between the bulged portion and the fixing bolt such that a second end portion of the belt-shaped portion protrudes from the lock portion.

6. The device connector according to claim 4, wherein the cover member includes a first mounting protrusion and a second mounting protrusion that extend along a circumferential direction thereof,
    a distance between the first mounting protrusion and the second mounting protrusion is set so as to allow insertion of the belt-shaped portion, and not to allow insertion of the lock portion, and
    the first mounting protrusion and the second mounting protrusion are not formed in a region in which the lock portion is disposed in the cover member.

* * * * *